UNITED STATES PATENT OFFICE.

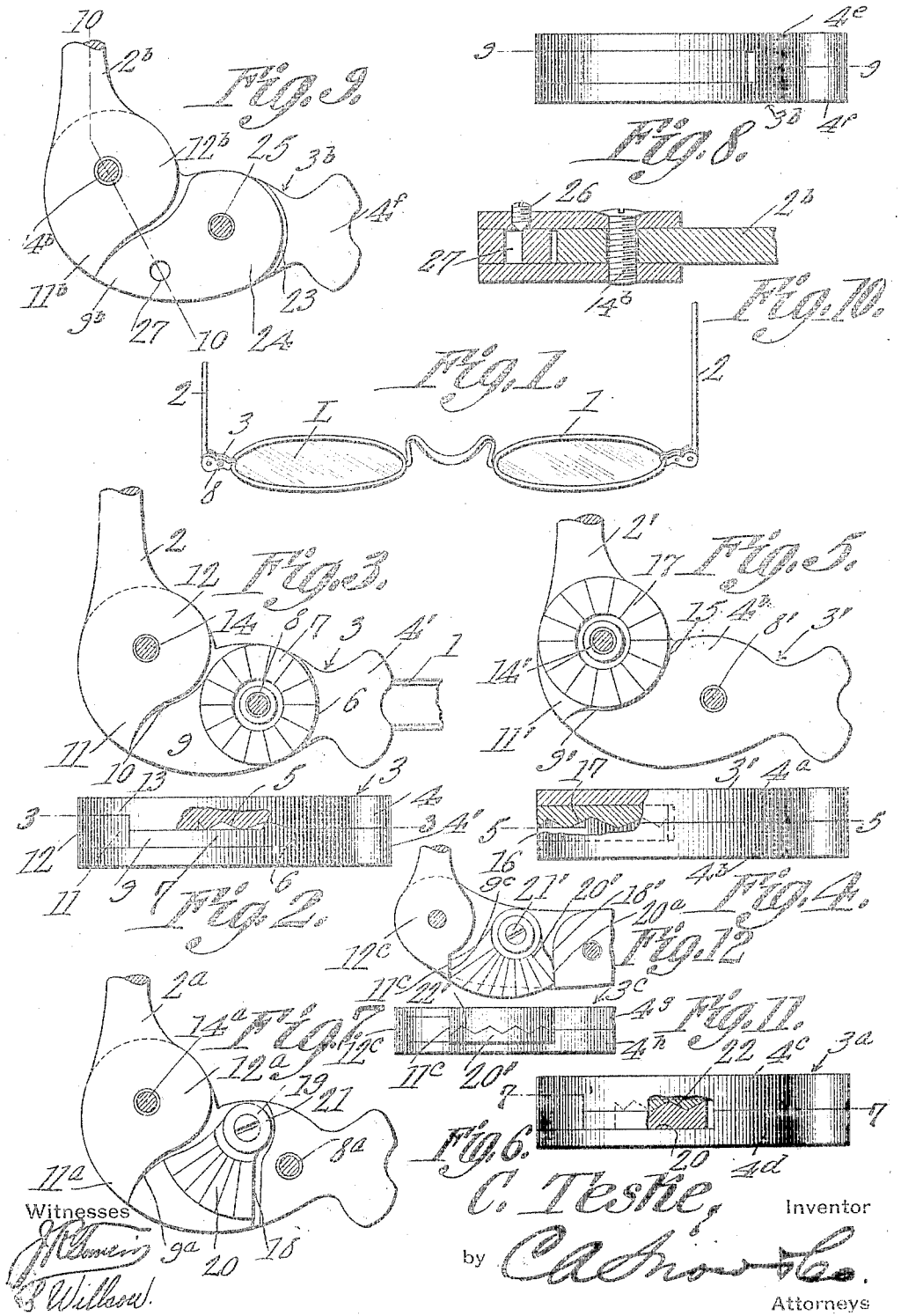

CHARLES TESKE, OF WILDROSE, NORTH DAKOTA.

SPECTACLE-FRAME.

1,116,514.  Specification of Letters Patent.  Patented Nov. 10, 1914.

Application filed November 6, 1913. Serial No. 799,546.

*To all whom it may concern:*

Be it known that I, CHARLES TESKE, a citizen of the United States, residing at Wildrose, in the county of Williams and State of North Dakota, have invented a new and useful Spectacle-Frame, of which the following is a specification.

The present invention relates to improvements in spectacle frames, one object of the invention, being the provision of a connecting medium between the temple bows and the lens frame, whereby the temple bows are permitted the necessary movement to collapse upon the frame, but are limited in outward movement to a plane at right angles to the plane of the lens within the lens frame, thus insuring at all times the proper positioning of the center of the lenses relatively to the eyes of the wearer, there being further provided adjustable means for taking care of the wear between the pivoting and movable parts of the temple bows and the connection so as to readjust and consequently maintain the temple bows in the desired relative position as before mentioned.

A further object of the present invention is the provision of a connection between the lens frame and a temple bow, in which is carried coöperating means for limiting the outward spreading of the temple bow so as to maintain the rigid portion adjacent the connection to an outward movement at right angles to the plane of the lens, the temple bow being permitted the necessary inward folding movement to permit of the collapsing of the bow parallel with the frame for storing in a case.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view showing the lens frame in perspective with portions of two temple bows attached thereto with the present connection. Fig. 2 is a view in elevation partially in section of the connection as illustrated in Fig. 1. Fig. 3 is a section taken on line 3—3 of Fig. 2. Fig. 4 is a view similar to Fig. 2 of a modified form of connection. Fig. 5 is a section taken on line 5—5 of Fig. 4. Fig. 6 is a similar view to Fig. 2 of still another modified form of connection. Fig. 7 is a section on line 7—7 of Fig. 6. Fig. 8 is a view in elevation of still another modified form of connection. Fig. 9 is a section taken on line 9—9 of Fig. 8. Fig. 10 is a section taken on line 10—10 of Fig. 9. Fig. 11 is a view similar to Fig. 2 of still another modification. Fig. 12 is a view similar to Fig. 3 of the device shown in Fig. 11.

Referring to the drawings, and more particularly to Figs. 1, 2 and 3, the numeral 1 designates the lens frame, and 2 the temple bows. The connection 3 which is composed of two sections 4—4' is soldered or otherwise connected to its respective side of the lens frame, the under side of the section 4 being corrugated as at 5 while the adjacent portion of the section 4' is recessed as at 6. Mounted for rotation in the recess 6 is a disk 7, the surface adjacent to the corrugated portion 5 of the member 4 being corrugated so as to coöperate therewith and form a locking means to prevent accidental oscillation or slipping of the disk 6, a screw 8 being disposed through the members 4—4' and also through the disk 7 to act as a clamping means to clamp the members 4 and 4' in the position as shown in Fig. 2 so that the disk 7 is held against movement. A projection 9 is formed integral with the disk 7 and has its curved edge 10 disposed adjacent to the hooked terminal 11 of the temple bow carrying disk 12 which fits between the members 4 and 4' within the recess 13 of the member 4. It will thus be seen that with the projections 9 and 11 positioned as clearly shown in Fig. 3, that the portion of the temple bow adjacent the connection 3 will be limited in its outward movement, so that when properly adjusted, the same will be prevented from spreading outwardly beyond a plane at right angles to the plane of the lens L carried by the lens frame 1. This point cannot be too greatly emphasized, for the reason that by limiting the outward position of the bows 2, when engaging the temples of the wearer with the nose-piece of the frame resting properly positioned upon the nose, both lens will be maintained with their centers properly positioned relatively to the eyes of the wearer and thus permit the best possible result when the spectacles are in use.

By means of the clamping screw 8 and the adjustable corrugated disk 7, it is evident that when the members 9 and 11 have worn sufficiently to permit the bows 2 to move outwardly beyond the right angled or desirable position, that the screw 8 may be loosened and the members 4—4' separated to permit of the readjustment of the disk 7 so that the projections 9 and 11 will again coöperate to limit the outward spreading of the bow.

In Figs. 4 and 5, the same principle is involved, a slight deviation in the structure being necessary to permit of the adjustment and arrangement of the parts to produce the desired result. In this instance, the connection 3' is composed of the two plates 4ª—4ᵇ, the member 4ᵇ being recessed as at 15 to provide the projection or shoulder 9' to correspond with the projection 9 in Fig. 3, the same however, being fixed and coöperating with the movable projection 11' carried by the corrugated disk 17. The disk 16 is formed integral with and carried by the temple bows 2'. The adjusting screw 8' constitutes a means for holding the plates 4ª—4ᵇ in adjusted position, while the disk 17 carried in the recessed portion of the member 4ª will be maintained and properly adjusted with relation to the corrugated disk 16 of the bow 2' so that the projections 9' and 11' will prevent the outward spreading of the bow 2' as heretofore described. In this instance, the pin or screw 14' is employed as a pivoting element between the connection 3' and the bow 2'.

In Figs. 6 and 7, the connection 3ª composed of the two members 4ᶜ—4ᵈ is employed, the section 4ᵈ being recessed as at 18 for the adjustable reception of the sleeve 19 having the segmental corrugated portion 20 and the curved projection 9ª. This member is adjustable within the recess 18 and is held in the desired adjustment by means of the screw 21. The under surface as at 22 of the member 4ᶜ is corrugated to coöperate with the corrugated portion 20 of the member 19, the clamping screw 8ª being provided to lock the sections 4ᶜ—4ᵈ together so as to maintain the member 19 in its desired adjusted position with its projection 9ª limiting the movement of the projection 11ª of the bow carried member or disk 12ª.

In the form of connection shown in Figs. 8, 9 and 10, the connection 3ᵇ is composed of the two plates 4ᵉ—4ᶠ both of which are recessed as at 23 for the reception of the cam 24, said cam 24 being disposed for oscillation upon the adjusting screw 25 which also acts as a clamping means to maintain the plates together. The hooked terminal 9ᵇ of the cam 24 is adapted to be held in the desired adjusted position by means of the screw 26 carried by the plate 4ᵉ and the aperture 27 of the cam 24. The terminal 9ᵇ coöperates with the projection 11ᵇ of the bow carried disk 12ᵇ so as to limit the movement of the bow 2ᵇ as heretofore described. The bow disk 12ᵇ in this instance is fixed upon the pin or screw 14ᵇ and thus is permitted the desired movement for collapsing as in the structure heretofore described. The screw 26 is provided with a conical wedging end so that the inclined face of such end will be caused to engage the edge of the cam 24 with its point entering the aperture 27, thus it will be seen that when the screw 25 is loosened and the screw 26 is rotated to move the wedging end thereof inwardly, that the inclined face of such wedging end acting upon the edge of the cam adjacent the aperture 27 will cause the cam to be moved to the desired adjustment, regardless of how slight it has been found necessary, at which time the screw 25 is tightened to lock the parts in such adjustment. With this form of adjusting means, the very finest adjustment is had, the screw 26 as heretofore stated constituting a wedging device to coöperate with the aperture 27 as clearly illustrated in Fig. 10 to thus adjust the cam 24, such adjustment being accomplished when the screw 25 is loosened.

In the form of connection shown in Figs. 11 and 12, the connection 3ᶜ composed of the two plates 4ᵍ and 4ʰ is recessed as at 18' for the reception of the adjusting member 20' carried by the screw 21', the bow carrying disk 12ᶜ having the projection 11ᶜ to coöperate with the flattened end 9ᶜ of the adjusting member 20'. The corrugated portion 22' of the plate 4ᵍ coöperating as in the form shown in Fig. 7, to lock the disk 20 in adjusted position.

From the foregoing description taken in connection with the detailed structure set forth and shown, it is evident that the correct harnessing, so to speak, of the spectacle frame upon the face and against the temples of the wearer, is particularly accomplished, the preventing of the movement of the temple bows outwardly beyond a plane at right angles to the plane of the lenses, accomplishing this result, and thus preventing defective vision due to the looseness of the connection of the bows to the lens frame. It has been found that as long as a well fitted spectacle frame is new and in proper condition, none of the inconveniences as to the outward spreading of the temple bows is permitted, but in the course of time the parts of the frame and the temple bows that press against each other at the connection will become worn to such an extent that the frame and temple bows cease to be at right angles to each other to press said bows against the temples and back of the ears sufficiently to maintain the lenses in proper relation to the eyes, such loose connection permitting the shifting up or down of the lenses and consequently out of the straight line position to the eyes that is necessary to produce the proper vision. It is therefore evident with the structure herein set forth, that these objections are overcome and that with the peculiar adjustable arrangement at the connection, the readjustment of the temple bows at right angles to the plane of the lens or in parallel to each other to properly engage the temples and ears of the wearer is accomplished.

What is claimed is:

1. A spectacle, including a lens frame, two temple bows, and means for attaching each temple bow to the frame, including a fixed member carried by the frame, a member carrying a temple bow pivotally attached to the fixed member, and means adjustably mounted in the fixed member for limiting the swinging movement of the temple bow.

2. A spectacle, including a lens frame, two temple bows, and means for attaching each temple bow to the frame, including a fixed member carried by the frame, a member carrying a temple bow pivotally attached to the fixed member, a projection carried by the latter member, and an adjustable element carried by the fixed member and provided with a projection to coöperate with the projection of the temple bow carrying member to limit the swinging movements of the temple bow.

3. A spectacle, including a lens frame, two temple bows, and means for attaching each temple bow to the frame, including a fixed member carried by the frame, a member carrying a temple bow pivotally attached to the fixed member, means adjustably mounted in the fixed member for limiting the swinging movement of the temple bow, and means for locking the last means in adjusted position.

4. A spectacle, including a lens frame, two temple bows, and means for attaching each temple bow to the frame, including a fixed member carried by the frame, a member carrying a temple bow pivotally attached to the fixed member, a projection carried by the latter member, an adjustable element carried by the fixed member and provided with a projection to coöperate with the projection of the temple bow carrying member to limit the swinging movements of the temple bow, and means for locking the last means in adjusted position.

In testimony that I claim the foregoing as my own, I have hereto affixed my signature in the presence of two witnesses.

CHARLES TESKE.

Witnesses:
FRANK RODGERS,
AGNES LUCKSLOFF.